Nov. 24, 1959 C. F. CARLSON ET AL 2,913,943
WORK HOLDING PLIERS
Filed Oct. 10, 1957

INVENTORS
CHESLEY F. CARLSON
FRED REMMELE
BY
H. F. Woodward

United States Patent Office 2,913,943
Patented Nov. 24, 1959

2,913,943

WORK HOLDING PLIERS

Chesley F. Carlson, Minneapolis, and Fred L. Remmele, St. Paul, Minn.

Application October 10, 1957, Serial No. 689,309

2 Claims. (Cl. 81—412)

This invention relates to a work holding device, similar in many respects to a pair of pliers. An object of the invention is to provide a holder for relatively small objects upon a work surface when subject to a cutting or shaping operation.

With the above and other objects in view, the invention consists of the improved device and its parts and combinations as set forth in the claims and all equivalents thereof.

In the accompanying drawings in which the same reference characters indicate the same in all views:

Figure 1 is an edge view of the holder on a work surface;

Figure 2:
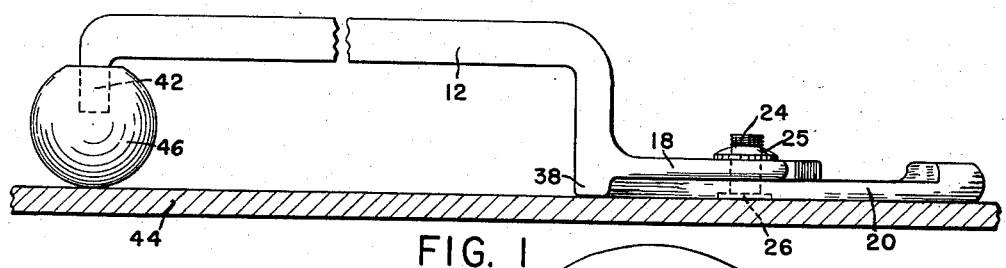
Figure 2 is a side elevation of the holder.
Figure 3:
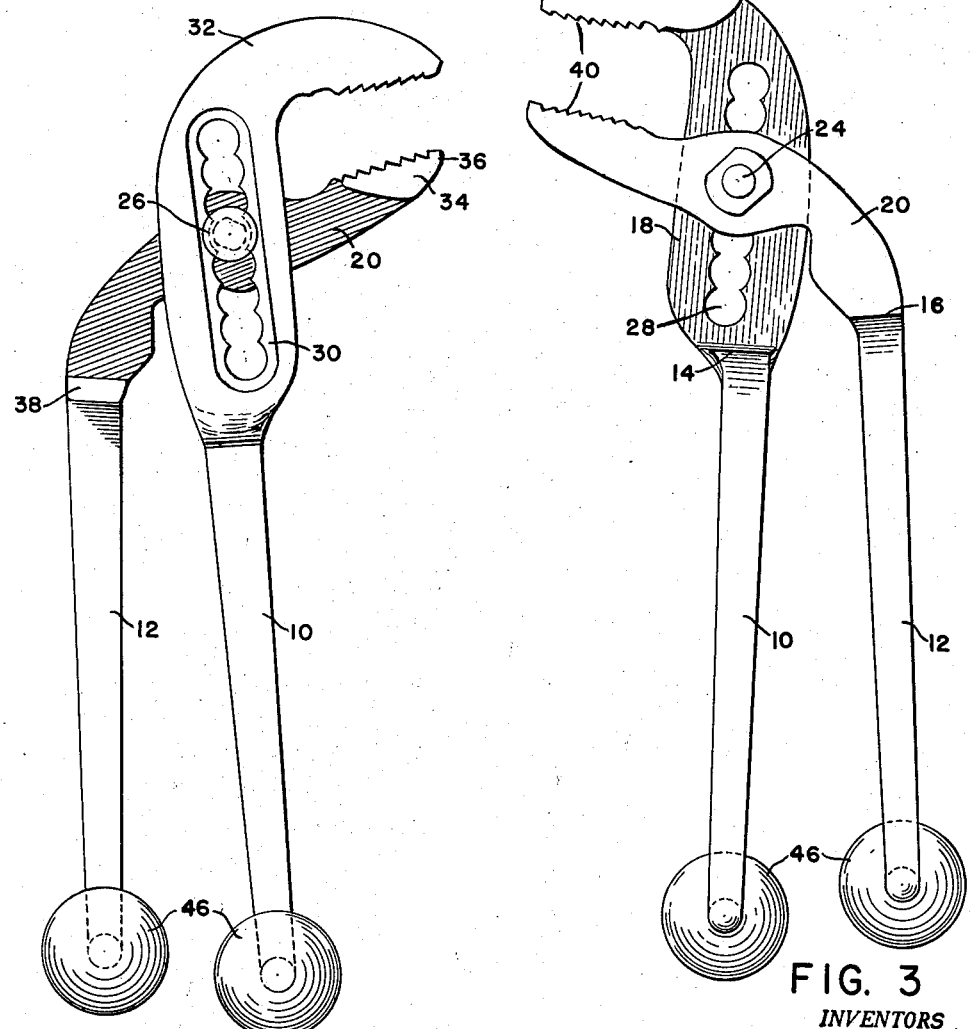
Figure 3 is a view of the device viewed from the opposite side.

The specific purpose of the workholder is to provide control of small printing plates during cutting with a drill rotating at about 22,000 r.p.m. Such a drill is set forth in Serial No. 630,982, filed December 12, 1956, or in Patent No. 2,787,197, and specifically involves the handling of small stereotype flat casts. Cutting may take the form of either removing metal from an exposed edge of the cast or removing metal from the inside of the cast which generally is considered an inside mortise. The specific problem of cutting with such a drill is that rotation at high speed develops a highly undesirable thrust and the action of the cutting tool raises the work as the cutting edge rotates and then drops the work as the cutting tool passes through and then again raises the work by the second cutting edge. This results in a "climbing" action and also in a very sharp and rapid chatter or excessive vibration of the work. This chatter is so severe as to, in some instances, jerk the work from the operator's hands.

Another application of the workholder involves control of small objects when placed in contact with rapidly moving surfaces such as a bandsaw, jigsaw, shaper, abrasive tool, drill, etc. The requirement in each case is that the workholder give control of the work in removing metal to a very close tolerance with safety to the operator.

The design principles of the holder are as follows:

First, the tool must have some device by which it can hold securely even the small pieces. This is accomplished by the jaws with the serrated edges to hold the work firmly. These jaws must also be sufficiently flexible in opening to accommodate a variety of sizes and shapes requiring special setting or manipulation.

Second application of pressure on the work held between the jaws must be more than adequate to resist the thrusts and vertical pressures encountered in cutting. This pressure must be applied easily and preferably with one hand to permit the other hand to function in guiding the work in relation to the cutting tool. It is best developed by a squeezing together of the fingers which is a natural, unrestricted movement.

Third, the workholder must permit a constant, simplified downward pressure on the work with no tilting of the work or the workholder. This requires a control of the plane surface or surfaces.

Fourth, the workholder must provide an easy, simple movement of the instrument and work to and from and about the cutting tool with a minimum of resistance and friction and a maximum of control of position to close tolerance.

Fifth, the workholder must have flexibility in opening of jaws for various sizes of work and in ability to hold down work of a wide variety of sizes and shapes without movement or slipping.

The device permits application of pressure by a simple squeezing together of the two arms or handles by the fingers of one hand. Output of pressure is in ratio to the length of the handles to the jaws and pivotal location.

Parallelism between workholder and work and the work surface on which the workholder and work rest is accomplished by providing bearing surfaces at the base of the handle ends such as balls, the point descending from one handle, the base surfaces of both jaws and the work held in the jaws of the workholder. This ability to maintain a parallel surface is of extreme importance in holding the work against the thrust of the cutting tool.

Simple movement of the workholder and work is possible because of the five bearing surfaces which prevent a tilting of workholder and because the handles of the workholder are so curved and elevated as to give the right hand flexibility of movement and the left hand a position over the front portion of the curved handles which enables the left hand to serve as a guiding medium.

The curvature of the handles is sufficiently back from the jaws to permit unobstructed view of the work and the cutting tool.

The new holder has an application in many fields and many operations where relatively small pieces of work must be held securely against the thrust and pressures of a moving tool or object and where the workholder will have a small flat surface on which to slide freely.

The device includes arms 10 and 12 bent downwardly at 14 and 16 where they are connected to jaws 18 and 20. The jaws 18 and 20 are pivotally connected intermediate of their ends by means of bolt 24 which is provided with flattened head portion 26 and carries at its other end lock nut 25. The bolt is firmly carried by jaw 20 and engages and secures jaw 18 through elongated slot 28 in the jaw 18. The bolt 24 is flattened on opposite longitudinal faces so that when the jaws are brought to their extreme opened position the bolt will slide freely in the slot 28, but when the jaws are in any other position, the bolt will enter one of the enlargements of the slot and hold the jaws pivoted at that point. The jaw on the bottom side is recessed at 30 and the head 26 of the bolt 24 is positioned in the recess. The bottom surface 32 of the jaw 18, the head 26 are in substantially the same plane. The surface 34 of the end 36 of jaw 20 and the extension 38 of arm 12 are in substantially the same plane as the surface 32.

The jaws 18 and 20 are serrated adjacent the end at 40 to enable the secure holding of the work piece. The handles 10 and 12 are bent downwardly at their free ends to provide support for such handles. The handles 10 and 12 with the legs are substantially U-shaped as shown in Figure 1. It is preferred that spherical members 40 be secured to the bent down ends 42 of the handles 10 and 12. The handle ends or members 46 ride upon the work surface 44. It is essential that the members 46, the extension 38, and the surfaces 32 and 34 be parallel to the work supporting surface 44.

What is claimed:

1. A device comprising two arm members having depending end portions and of substantially inverted U-shaped configuration, a pair of jaws having coplanar bottom surfaces and connected to the arms, said jaws extending across each other substantially medially of their length, one of said jaws at the crossing part having a slot with spaced enlargements in the sides of the said slot, a headed bolt projecting from the other jaw substantially medially of its length and extending through the slot and movable through the slot when in a predetermined position, and spherical members secured to one end position of each arm with the bottom portion of the spherical members in substantially the same horizontal plane as the bottom surfaces of the jaws.

2. A device comprising a pair of jaws extending across each other substantially medially of their length, said jaws pivotally connected substantially at the medial point of their length, arm members having ends connected to the jaws, the said arm members extending upwardly from the jaw members and then substantially horizontally and thence downwardly with the lower ends of the upwardly extending arms and the lower ends of the downwardly extending arms being coplanar with the bottom surfaces of the jaws whereby said ends and said bottom surfaces may contact a planar work supporting surface.

References Cited in the file of this patent

UNITED STATES PATENTS

| | | |
|---|---|---|
| 1,216,886 | Thomson | Feb. 20, 1917 |
| 1,686,640 | Pierce | Oct. 9, 1928 |
| 2,557,296 | Kress | June 19, 1951 |